United States Patent
Phan Huy et al.

(10) Patent No.: US 8,451,181 B2
(45) Date of Patent: May 28, 2013

(54) METHOD OF ESTIMATING THE FOCUSING QUALITY OF A SIGNAL PRE-EQUALIZED BY TIME REVERSAL

(75) Inventors: Dinh Thuy Phan Huy, Paris (FR); Joe Wiart, Lagny sur Marne (FR); Youmni Ziade, Bourg la Reine (FR); Jean-Philippe Desbat, Paris (FR)

(73) Assignee: France Telecom, Paris (FR)

( * ) Notice: Subject to any disclaimer, the term of this patent is extended or adjusted under 35 U.S.C. 154(b) by 404 days.

(21) Appl. No.: 12/996,822

(22) PCT Filed: Jun. 26, 2009

(86) PCT No.: PCT/FR2009/051239
§ 371 (c)(1),
(2), (4) Date: Dec. 8, 2010

(87) PCT Pub. No.: WO2009/156705
PCT Pub. Date: Dec. 30, 2009

(65) Prior Publication Data
US 2011/0115680 A1    May 19, 2011

(30) Foreign Application Priority Data

Jun. 27, 2008   (FR) ................................. 08 54360

(51) Int. Cl.
*G01R 29/10*    (2006.01)
*H03H 7/30*    (2006.01)

(52) U.S. Cl.
USPC ........................... 343/703; 375/220; 375/232

(58) Field of Classification Search
USPC ................. 343/702, 703; 375/219, 220, 221, 375/232, 259, 285
See application file for complete search history.

(56) References Cited

U.S. PATENT DOCUMENTS

| 2003/0138053 | A1 | 7/2003 | Candy et al. | |
| 2005/0185733 | A1* | 8/2005 | Tolli et al. | 375/285 |
| 2011/0103457 | A1* | 5/2011 | Phan Huy et al. | 375/232 |
| 2012/0183037 | A1* | 7/2012 | Allpress et al. | 375/232 |
| 2012/0201288 | A1* | 8/2012 | Kolze et al. | 375/232 |

OTHER PUBLICATIONS

Gomes et al., "Time-Reversed OFDM Communication in Underwater Channels," 2004 IEEE 5th Workshop on Signal Processing Advances in Wireless Communications, Lisbon, Portugal, Jul. 11-14, 2004, Piscataway, NJ, USA, IEEE, pp. 626-630 (Jul. 11, 2004).

Pajusco et al., "Characterization of UWB Time Reversal Using Circular Array Measurements," Proceedings of the 10th European Conference on Wireless Technology, pp. 102-105 (Oct. 1, 2007).

(Continued)

*Primary Examiner* — Tan Ho
(74) *Attorney, Agent, or Firm* — Drinker Biddle & Reath LLP

(57) ABSTRACT

A method is provided for estimating the focusing quality of a signal pre-equalized by time reversal of an estimated propagation channel between a source antenna of a source communicating entity and a destination antenna of a destination communicating entity, the method comprising a step of evaluating a focusing quality of the signal received at the destination antenna relative to a value at a focal point of a representation of a curve of received power as a function of a distance between the destination antenna and the focal point.

12 Claims, 2 Drawing Sheets

OTHER PUBLICATIONS

Sharma et al., "Compensating the Effects of Target Acceleration in Dual-Channel SAR-GMTI," IEE Proceedings: Radar, Sonar & Navigation, Institution of Electrical Engineers, GB, vol. 153 (1), pp. 53-62 (Feb. 16, 2006).

Tourin et al., "Time Reversal Telecommunications in Complex Environments," Comptes Rendus—Physique, Elsevier, Paris, France, vol. 7(7), pp. 816-822 (Sep. 1, 2006).

* cited by examiner

METHOD OF ESTIMATING THE FOCUSING QUALITY OF A SIGNAL PRE-EQUALIZED BY TIME REVERSAL

CROSS-REFERENCE TO RELATED APPLICATIONS

This application is the U.S. national phase of the International Patent Application No. PCT/FR2009/051239 filed Jun. 26, 2009, which claims the benefit of French Application No. 08 54360 filed Jun. 27, 2008, the entire content of which is incorporated herein by reference.

FIELD OF THE INVENTION

The field of the invention is that of telecommunications and more precisely that of radio communication techniques between communicating entities.

The invention relates more particularly to the quality of transmission of a signal based on a time reversal technique between two communicating entities.

BACKGROUND

A radio signal transmitted by an antenna of a communicating entity is subject to distortion as a function of the propagation conditions between a source point defined at the output of the source antenna and a destination point defined at the input of an antenna of the destination communicating entity. To limit this distortion, the antenna signal is predistorted by applying pre-equalization coefficients as a function of the characteristics of the propagation channel between these two antennas. It is therefore necessary to characterize this propagation channel.

Of existing pre-equalization methods, methods using time reversal are distinguished by their reduced complexity, their performance, and their intrinsic capacity for focusing a radio wave onto a receive antenna. Time reversal makes it possible to reduce significantly the temporal dispersion of the propagation channel by focusing the energy of the received signal in time and in space.

Time reversal is a technique for focusing waves, typically acoustic waves, that relies on the invariance of the wave equation on time reversal. Thus a time-reversed wave propagates like a forward wave traveling back in time. A short pulse emitted from a source point propagates in a propagation medium. Part of this wave received by a destination point is time reversed before it is sent back in the propagation medium. The wave sent back converges toward the source point, where it forms a short pulse, and the energy of the wave is focused on the source point. The shape of the signal focused on the source point by time reversal is virtually identical to that of the source signal emitted at the source point. Thus time recompression occurs at the source point. In particular, the more complex the propagation medium, the more precisely the time-reversed wave converges.

The time-reversal technique is therefore applied in radio communications networks to cancel the effect of the propagation channel on the signal, notably by reducing the spreading of the channel, and to simplify the processing of symbols received after passing through the channel. The antenna signal emitted by an antenna of the source communicating entity is thus pre-equalized by applying coefficients that are obtained by time reversing the impulse response of the propagation channel that this signal has to pass through. The time reversal of the propagation channel applied to the signal makes it possible to cancel the effect of this channel on transmission from the source point of the signal predistorted in this way and to focus the signal on a destination antenna. Time reversal therefore requires the source communicating entity to have knowledge of the propagation channel.

However, if the communicating entities are mobile, the channel estimate produced at a given time by a communicating entity may prove erroneous at a later time because of the mobility of the communicating entities. This error is qualified relative to a defined relative movement as a function of the movement of the source communicating entity as observed from the destination communicating entity. For large relative movements there is decorrelation between the estimate of the propagation channel used to predistort the signal and the propagation channel that the signal actually passes through. The signal is not focused on the antenna of the destination communicating entity and the power of the received signal is lower than the power of the signal that would be received in the absence of relative movement.

The defocusing of the signal at the destination antenna is in fact generated by the relative movement and by a latency delay. The latency delay is the overall delay including a processing delay between measurement of the propagation channel and transmission of the pre-equalized signal and a delay between transmission and reception of the pre-equalized signal.

The position of the destination antenna relative to the estimate of the propagation channel applied to the pre-equalized signal defines a focal point. The focal point therefore corresponds to the position of the destination antenna relative to the source antenna before the latency delay. In other words, the focal point corresponds to the point of convergence of the waves with stationary communicating entities and no latency delay. If one or both of the two communicating entities moves during the latency delay, the destination antenna is at a position that is different from the position of the focal point relative to the source antenna, and the focal point is therefore not respected.

If the signal is not focused, the quality of service is degraded. The quality of service is for example the data rate offered or an error rate for the data conveyed by the signal. Thus the quality of service deteriorates as soon as the destination communicating entity and/or the source communicating entity moves. This deterioration increases as the movement of the source communicating entity relative to the destination communicating entity during the latency time increases. In other words, the power received at the destination antenna decreases if the relative movement increases during the latency time. Moreover, this deterioration is a function of the carrier frequency of the pre-equalized signal.

It is therefore necessary to qualify focusing quality.

SUMMARY

To achieve this objective, the invention proposes a method of estimating focusing quality of a signal pre-equalized by time reversal of an estimated propagation channel between a source antenna of a source communicating entity and a destination antenna of a destination communicating entity, said communicating entities being capable of relative movement. The estimation method includes a step of evaluating a focusing quality of the signal received at the destination antenna relative to a value at a focal point of a representation of a curve of received power as a function of a distance between the destination antenna and the focal point, the focal point corresponding to a position of said destination antenna relative to said source antenna before a latency delay.

This method therefore makes it possible to estimate focusing quality by exploiting space-time properties of the time reversal process for any frequency of the transmitted signal. Thus focusing quality is expressed relative to the maximum quality that must be achieved at a focal point, and not as an absolute quality that depends on the carrier frequency of the signal. The focal point corresponds to the position of the destination antenna relative to the source antenna before the latency delay. Estimating focusing quality based on the position of the destination antenna relative to the focal point makes it possible to evaluate quality simply and quickly.

The representation of the received power curve is a decreasing function of the distance between the destination antenna and the focal point.

Thus the representation of the received power curve expresses the quality variation resulting from the movement of one or both communicating entities during the latency delay.

Focusing quality is evaluated on the basis of an evaluation of the movement of the source communicating entity relative to the destination communicating entity.

Focusing quality is thus simple to evaluate, without requiring measurement of the power of the received signal, by evaluating the deterioration in the quality of the signal given a movement of the destination antenna relative to the focal point.

Thus focusing quality is given directly by the carrier frequency of the signal and the estimate of the movement of the source communicating entity relative to the destination communicating entity.

Focusing quality may also be evaluated on the basis of an estimate of a time symmetry of the received signal.

The quality is thus evaluated by processing the signal by fast methods of relatively low complexity.

Focusing quality may also be evaluated on the basis of an estimate of a time symmetry and a power symmetry of the received signal.

Received signal time information and power information are thus exploited conjointly, making it possible to increase the accuracy of the evaluation of focusing quality.

Focusing quality may be evaluated on the basis of an estimate of a time spreading factor of the signal received via the destination antenna relative to a time spreading factor of a referent signal at the focal point or on the basis of an estimate of an autocorrelation of the propagation channel.

These two evaluations of focusing quality are relatively insensitive to synchronization errors in the signal received by the destination communicating entity. These two evaluations of focusing quality further include a step of the destination antenna receiving a pulse transmitted by the source antenna. The received pulse data thus enables comparison of estimates of the impulse response of a channel effected at different times and thus makes it possible to increase the accuracy of the evaluation.

The invention also provides a device for estimating the focusing quality of a signal pre-equalized by time reversal of an estimated propagation channel between a source antenna of a source communicating entity and a destination antenna of a destination communicating entity, the communicating entities being capable of relative movement. The device includes an evaluator for evaluating a focusing quality of the signal received at the destination antenna relative to a value at a focal point of a representation of a curve of received power as a function of a distance between the destination antenna and the focal point, the focal point corresponding to a position of said destination antenna relative to the source antenna before a latency delay.

The invention also provides a communicating entity of a radio communications system including the above device for estimating focusing quality.

The invention also provides a radio communications system including at least one communicating entity of the invention.

The devices, the communicating entity, and the system have advantages analogous to those described above.

BRIEF DESCRIPTION OF THE DRAWINGS

Other features and advantages of the present invention become more clearly apparent on reading the following description, given by way of illustrative and non-limiting example only, of particular implementations of the invention and the associated communicating entities, and from the appended drawings, in which.

DETAILED DESCRIPTION

For clarity, the invention is described for the unidirectional transmission of a data signal from a communicating entity EC1 to a destination communicating entity EC2. The invention relates equally to bidirectional transmission and also provides communicating entities including a plurality of transmit or receive antennas.

Figure 1:
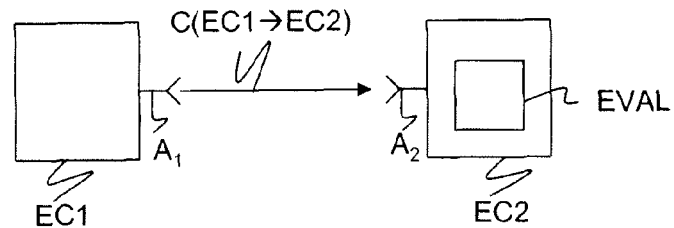
FIG. 1 is a block diagram of a source communicating entity communicating with a destination communicating entity in accordance with one implementation of the invention.

Referring to FIG. 1, a communicating entity EC1 is able to communicate with a destination entity EC2 via a radio communications network not represented in the figure.

For example, the radio communications network is a UMTS (Universal Mobile Telecommunications system) cellular radio communications network as defined by the 3GPP (3rd Generation Partnership Project) organization and evolutions thereof including 3GPP-LTE (LTE standing for "Long-Term Evolution"), or a WIMAX (Worldwide Interoperability for Microwave Access) radio communications network.

The communicating entities may be mobile terminals, terrestrial or satellite base stations, access points or any equipment fitted with a communication card.

The source communicating entity EC1 is able to transmit a data signal on a carrier frequency $f_p$ from an antenna $A_1$ to the destination communicating entity EC2.

The destination communicating entity EC2 is adapted to receive the data signal at an antenna $A_2$ of the destination communicating entity and to restore the data from the received signal.

A data signal is prefiltered by applying coefficients of a time-reversed estimated impulse response $h_{rt}(t)$. The impulse response is representative of the propagation channel C(EC1→EC2) between the antenna of the source communicating entity $A_1$, referred to as the source antenna, and the antenna of the destination communicating entity $A_2$, referred to as the destination antenna.

In TDD mode, transmission in a first direction, for example from the source communicating entity EC1 to the destination communicating entity EC2, and transmission in a second direction opposite the first direction are effected on the same carrier frequency at different times. The impulse response of the propagation channel is conventionally estimated by the source communicating entity EC1 on the basis of an analysis of the signals transmitted in the second direction.

In FDD mode, transmission in the first direction and transmission in the opposite direction are effected in different frequency bands. The knowledge by the source communicating entity EC1 of the propagation channel corresponding to the first transmission direction may be obtained from an estimate of the propagation channel effected by the destination communicating entity EC2, for example.

Whatever the transmission mode, the source communicating entity EC1 or the destination communicating entity EC2 is thus adapted to estimate the propagation channel. If this estimation is performed by the destination communicating entity EC2, this entity is adapted to deliver to the source communicating entity the estimate or pre-equalization coefficients obtained by time reversal of the estimate.

A processing delay is defined by the time interval separating measurements of the propagation channel and transmission of the pre-equalized signal determined from those measurements. The processing delay, to which is added a time interval separating transmission and reception of the pre-equalized signal, determines a latency delay $D_L$. The latency delay is a configuration parameter of the communicating entities.

FIG. 1 shows only the means of the destination communicating entity that relate to the invention. The destination communicating entity EC2 further includes a central control unit, not shown, connected to and adapted to control the operation of those means.

The destination communicating entity includes an evaluator EVAL of the focusing quality of a signal received by the destination antenna relative to a value at a focal point of a representation of a curve of received power as a function of distance between the destination antenna and a focal point.

Figure 2:
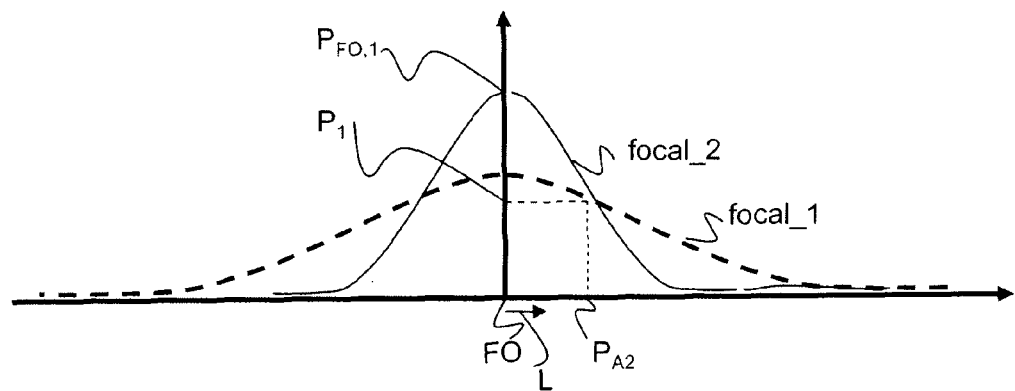
FIG. 2 represents examples of representations of curves of received power as a function of distance between a destination antenna and a focal point.

The determination of the representation of the received power curve is described with reference to FIGS. 2 and 3.

The power of a pre-equalized signal received at the destination antenna $A_2$ determines the quality of the signal and thus a quality of service, for example a data rate offered or a data error rate. In the absence of movement v of the source communicating entity EC1 relative to the destination communicating entity EC2 and in the absence of any latency delay $D_L$, the power of a signal pre-equalized by time reversal is at a maximum at the point of convergence of the waves at the destination antenna, called the focal point. Thus the focal point corresponds to the position of the destination antenna relative to the source antenna before the latency delay.

If the communicating entities move during the latency time, the focal point is no longer valid. This transgression is expressed as a function of the latency delay $D_L$ and the movement v of the source communicating entity relative to the destination communicating entity. The distance between the position of the destination antenna and the focal point is thus given by the product of the relative movement v, for example in the form of a speed, and the latency time:

$$L = v \cdot D_L$$

The relative movement v must be understood below as the movement of the source communicating entity as seen from the destination communicating entity.

The power is no longer maximum if the destination antenna is far from the focal point, for example for an unsuitable latency delay or during movement of one or both communicating entities. FIG. 2 represents two examples of representations of curves of received power as a function of distance between the destination antenna and the focal point. The function focal_1 corresponding to transmission of a pre-equalized signal on a carrier frequency $f_1$ is at a maximum at the focal point FO and decreases as a monotonous function of the distance L to the focal point.

The received power $P_1$ at a position of the destination antenna $P_{A2}$ at a distance L from the focal point is less than the received power $P_{FO,1}$ at the focal point.

The extent and shape of a received power curve are a function of the propagation channel and notably of the carrier frequency of the signal. The representation of the received power curve widens as the carrier frequency decreases. Thus the function focal_1 corresponds to a frequency $f_1$ that decreases as the carrier frequency $f_2$ increases relative to the function focal_2.

The above properties are demonstrated for example in the paper entitled "Signal Frequency and Bandwidth Effects on the Performance of UWB Time-Reversal Technique", A. Khaleghi and G. El Klein, Loughborough Antennas and Propagation Conference, 2007, pages 97 to 100.

In the general case, qualifying focusing quality may rely on a representation of the power curve of the received signal that expresses the variation of quality as a function of the distance to the focal point and depends on the carrier frequency of the signal. The representation is such that:
its maximum value is reached at the focal point;
it decreases as a monotonous function of the distance between the destination antenna and the focal point.

There may equally be considered a so-called normalized representation of the received power curve for which the maximum value is exactly the same for all carrier frequencies. The normalized representation of the received power curve is a decreasing monotonous function of the distance to the focal point such that for a given distance L between the destination antenna and the focal point, if $Q_1$ and $Q_2$ are two values of focusing quality for respective carrier frequencies $f_1$ and $f_2$ where $f_1$ is less than $f_2$, then $Q_1$ is greater than $Q_2$. Accordingly, for a position $P_{A2}$ of the destination antenna at a distance L from the focal point, the focusing quality corresponding to transmitting a signal on the carrier frequency $f_1$ is greater than the focusing quality corresponding to transmitting a signal on the carrier frequency $f_2$.

Figure 3:
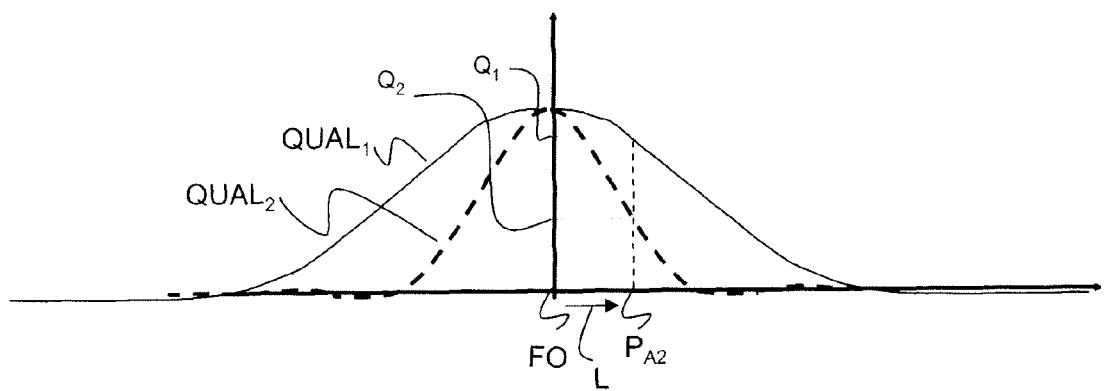
FIG. 3 represents examples of normalized representations of received power curves.

FIG. 3 shows normalized representations of the received power curves, the curve $QUAL_1$ corresponding to transmitting a pre-equalized signal on a frequency $f_1$ and the curve $QUAL_2$ corresponding to transmitting a pre-equalized signal on a frequency $f_2$ where the frequency $f_1$ is less than the frequency $f_2$.

Different methods of evaluating focusing quality are described below based on the space-time properties of the focusing of a signal by time reversing an estimate of the impulse response $h_{rt}(t)$. The impulse response is representative of the propagation channel C(EC1→EC2) between the source antenna and the destination antenna. The transfer function of the estimate of the impulse response of the propagation channel is denoted $H_{rt}(f)$.

The signal focusing quality at the destination antenna is evaluated by the evaluator EVAL relative to the value for the focal point of the representation of the curve of received power as function of a distance between the destination antenna and the focal point. The focal point corresponds to the position of the destination antenna relative to the source antenna before the latency delay.

Starting with the signal received at the destination antenna, the evaluation methods described are based on an estimate of the relative movement, an evaluation of the time or power symmetry of the received signal or an estimate of the temporal spreading of the received signal or the autocorrelation of the propagation channel. Quality indices are then determined independently of the real position of the focal point, which need not be known, and with no measurements effected at the focal point.

Figure 4:
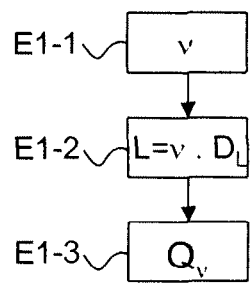
FIGS. 4, 5, 6, 7, and 8 represent steps of evaluating focusing quality in different implementations of the invention.

A first method of evaluating focusing quality is described with reference to FIG. 4. Focusing quality is evaluated from the estimate of the movement of the source communicating entity relative to the destination communicating entity.

In the step E1-1, the destination communicating entity estimates the relative movement v of the source communicating entity. For example, the relative movement may be estimated on the basis of positions of the communicating entities established using the GPS (Global Positioning System) technology familiar to the person skilled in the art. By way of non-limiting example, the paper entitled "The SMART Project—Speed Measurement Validation in Real Traffic Conditions", P. Bellucci, E. Cipriani, M. Gagliarducci, and C. Riccucci, Proceedings of the 8th International IEEE Conference on Intelligent Transportation Systems, Vienna, Austria, Sep. 13-16, 2005, describes a method of measuring the relative movement for a mobile system.

In the step E1-2 the destination communicating entity estimates a distance L from the destination antenna to the focal point from the latency delay $D_L$ and the estimate of the relative movement v, for example in the form of a speed, such that:

$$L = v \cdot D_L$$

In the step E1-3, the communicating entity estimates, using the estimated distance to the focal point, the focusing quality $Q_v$ relative to the value at the focal point of the representation of the received power curve. Focusing quality is given by:

$$Q_v = \frac{(\lambda/2) - L}{(\lambda/2)}$$

in which $\lambda$ is the wavelength at the carrier frequency $f_p$ of the pre-equalized signal transmitted by the source antenna and given by $\lambda = c/f_p$, where c is the speed of light.

Alternatively, focusing quality $Q_{Bessel}$ is estimated by modeling the received power curve based on a zero order Bessel function given by:

$$Q_{Bessel} = \text{Bessel}\left(\frac{L}{\lambda}\right)$$

Figure 5:
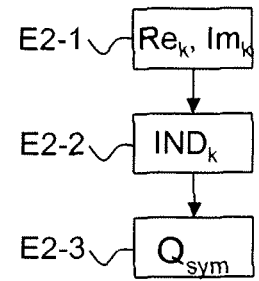

A second method of evaluating focusing quality is described with reference to FIG. 5. Focusing quality is evaluated on the basis of an estimate of the time symmetry of the received signal. To this end, a signal symmetry index is introduced. It is known that a signal pre-equalized by time reversal is perfectly symmetrical in time at the focal point. This symmetry is not obtained outside the focal point and the dissymmetry increases with the distance to the focal point.

In the step E2-1, the communicating entity computes the discrete Fourier transform of the pre-equalized signal received via the destination antenna in order to obtain a frequency domain representation of the signal. A frequency domain representation $S(f_k)$ of the received data signal s(t) is complex and comprises a real part $\text{Re}_k$ of $S(f_k)$ and an imaginary part $\text{Im}_k$ of $S(f_k)$ for any carrier frequency $f_k$ from the total bandwidth $B_{EC}$ allocated to the destination communicating entity.

In the step E2-2, the destination communicating entity evaluates for each carrier frequency $f_k$ allocated to the destination communicating entity a symmetry index $\text{IND}_k$ of the received signal given by:

$$\text{IND}_k = \frac{\text{Re}_k^2}{(\text{Re}_k + \text{Im}_k)^2}$$

In the step E2-3, the communicating entity determines focusing quality $Q_{sym}$ relative to the value of the representation of the power curve at the focal point, given by:

$$Q_{sym} = \frac{\sum_{k=1}^{N_f} \text{IND}_k}{N_f}$$

where $N_f$ designates the number of carrier frequencies allocated to the destination communicating entity in the band $B_{EC}$.

Figure 6:
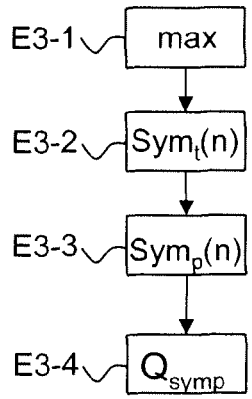

A third method of evaluating focusing quality is described with reference to FIG. 6. Focusing quality is evaluated on the basis of an estimate of the time symmetry and the power symmetry of the received signal. A time dissymmetry measured at a time $t_{max}$, which corresponds to the time at which the energy of the signal is concentrated, must have a greater influence on quality than a dissymmetry measured at another time. In other words, a dissymmetry at a given time has more influence on the overall dissymmetry of the signal when the energy of the signal is greater at this point.

Focusing quality is evaluated on the basis of the sampled received time domain signal of which a sample at time $t_n$ is denoted $s(t_n)$.

In the step E3-1, the communicating entity determines the index max such that the value of the sample $s(t_{max})$ of the signal is a maximum value.

In the step E3-2, the communicating entity determines N values of time symmetry $\text{Sym}_t(n)$ of the received signal for different time differences relating to the sample of the signal at the time $t_{max}$ determined in the step E3-1:

$$\text{Sym}_t(n) = \frac{|s(t_{max} + t_{n+max}) - s(t_{max} - t_{n+max})|/\sqrt{E}}{(t_{n+max} - t_{max})/\tau}$$

where E is the energy of the received signal and $\tau$ is the estimated time spreading factor of the received signal.

The number N of symmetry values is a configurable parameter of the destination communicating entity, the accuracy of the quality evaluation increasing with N.

The time spreading factor $\tau$ may be evaluated using the method described in the paper "Delay Spread Estimation for Wireless Communications systems", Hüseyin Arslan and Tevfik Yücek, Proceedings of the Eighth IEEE International Symposium on Computers and Communications, 2003, for example.

In the step E3-3, the communicating entity determines N symmetry values $\text{Sym}_P(n)$ of the power of the received signal for different time differences relative to the sample of the signal at the time $t_{max}$ determined during the step E3-1:

$$Sym_p(n) = \frac{\left[\sqrt{|s(t_{max} + t_{n+max})|^2 + |s(t_{n\,max} - t_{n+max})|^2}\,\right]/\sqrt{E}}{2(t_{n+max} - t_{max})/\tau}$$

In the step E3-4, the communicating entity determines focusing quality $Q_{symp}$ relative to the value of the representation of the received power curve at the focal point, given by:

$$Q_{symp} = \frac{1}{N}\sum_{n=1}^{N}\frac{(\pi^2/4) - [\text{atan}(Sym_t(n))\cdot\text{atan}(Sym_p(n))]}{\pi^2/4}$$

where atan designated the arc tangent operator.

Figure 7:
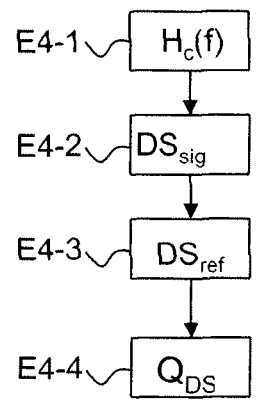

A fourth method of evaluating focusing quality is described with reference to FIG. 7. Focusing quality is evaluated on the basis of an estimate of a time spreading factor of the received signal relative to the time spreading of a referent signal at the focal point. The time spreading factor of a signal is also frequently referred to in the literature as the delay spread.

A property of the spreading factor is that it decreases with the distance to the focal point as demonstrated in the paper "Characterization of Space-Time Focusing in Time-Reversed Random Fields", Claude Oestges, Arnold D. Kim, George Papanicolaou, and Arogyaswami J. Paulraj, IEEE Transactions on Antennas and Propagation, vol. 53, January 2005.

In the step E4-1, the source communicating entity transmits a pulse to the destination communicating entity. This entity thus receives an impulse response $h_c(t)$ of the propagation channel between the source entity and the destination entity or, which amounts to the same thing, the transfer function of the propagation channel $H_c(f)$.

In the step E4-2, the destination communicating entity measures the time spreading factor $DS_{sig}$ of the received signal, for example using the method described in the paper "Delay Spread Estimation for Wireless Communications systems", Hüseyin Arslan and Tevfik Yücek, Proceedings of the Eighth IEEE International Symposium on Computers and Communications, 2003.

In the step E4-3, the destination communicating entity evaluates the time spreading factor $DS_{ref}$ of a referent signal ref(t) constructed from the pulse received during the step E4-1 to which is applied the time reversed estimate of the impulse response of the propagation channel $h_{rt}(t)$ used to pre-equalize the signal. In the frequency domain, the referent signal is thus given by:

$$REF(f) = H_{rt}(f)^* H_c(f)$$

In the step E4-4, the communicating entity determines focusing quality $Q_{DS}$ relative to the value of the representation of the received power curve at the focal point, given by:

$$Q_{DS} = \frac{DS_{ref}}{DS_{sig}}$$

Figure 8:
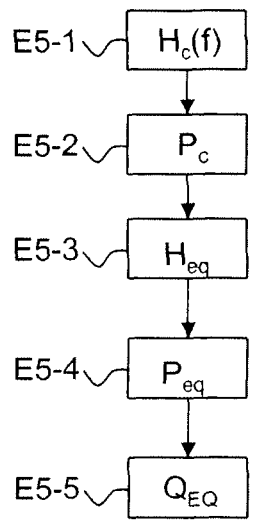

A fifth method of evaluating focusing quality is described with reference to FIG. 8. Focusing quality is evaluated on the basis of a ratio between the power of the received signal and the power of a referent signal. This power ratio is representative of an estimate of the autocorrelation of the propagation channel.

In the step E5-1 the source communicating entity transmits a pilot signal or pulse to the destination communicating entity, which estimates an impulse response $h_c(t)$ of the propagation channel between the source communicating entity and the destination communicating entity or, which amounts to the same thing, the transfer function of the propagation channel $H_c(f)$.

In the step E5-2 the destination communicating entity determines the power of the propagation channel. For example, the power $P_c$ of the propagation channel is evaluated relative to the bandwidth B of the signal and the bandwidth W(B) by any power evaluation method familiar to the person skilled in the art:

$$P_c = \frac{1}{W(B)}\int_{f \in B}\|H_c(f)^* \times H_c(f)\|^2$$

In the step E5-3, the destination communicating entity demodulates the pre-equalized signal received at the destination antenna and estimates the equivalent propagation channel $H_{eq}(f)$ given by the product of the conjugate of the transfer function of the propagation channel $H_{rt}(f)$ and the transfer function $H_c(f)$:

$$H_{eq}(f) = H_{rt}(f)^* H_c(f)$$

the transfer function $H_{rt}(f)$ corresponding to the impulse response $h_{rt}(f)$ used to pre-equalize the transmitted signal.

In the step E5-4, the communicating entity determines the power of $P_{eq}$ of the equivalent channel. For example, the power of the equivalent channel is evaluated relative to the bandwidth B of the signal and to the size W(B) of the bandwidth:

$$P_{eq} = \frac{1}{W(B)}\int_{f \in B}\|Heq(f)\|^2$$

In the step E5-5, the destination communicating entity determines focusing quality $Q_{EQ}$ relative to the value at the focal point of the representation of the received power curve, given by:

$$Q_{EQ} = \frac{\|P_{eq}\|^2}{\|P_c\|^2}$$

Alternatively, focusing quality is evaluated by combining different measurements described above. Accordingly, considering the evaluation of $Q_v$, $Q_{Bessel}$, $Q_{sym}$, $Q_{symp}$, $Q_{DS}$, and $Q_{EQ}$ respectively defined on the basis of relative movement and wavelength, relative movement and a Bessel function, the estimate of the time symmetry of the received signal, the estimate of the time symmetry and power symmetry, the time spreading factor, and the auto-correlation of the channel, focusing quality is obtained by applying a combinatorial monotonous increasing function of the evaluations $Q_v$, $Q_{Bessel}$, $Q_{sym}$, $Q_{symp}$, $Q_{DS}$, and $Q_{EQ}$.

The invention described here relates to a device for estimating focusing quality used in a communicating entity. Consequently, the invention applies equally to a computer program, notably a computer program on or in an information storage medium, adapted to implement the invention. This program may use any programming language and take the form of source code, object code or a code intermediate between source code and object code, such as a partially-compiled form, or any other form suitable for implementing those of the steps of the method of the invention executed in the destination communicating entity.

The invention claimed is:

1. A method of estimating a focusing quality of a signal pre-equalized by time reversal of an estimated propagation channel between a source antenna of a source communicating entity and a destination antenna of a destination communicating entity, said communicating entities being relatively movable, the method comprising: a step of evaluating a focusing quality of the signal received at the destination antenna relative to a value at a focal point of a representation of a curve of received power as a function of a distance between the destination antenna and the focal point, said focal point corresponding to a position of said destination antenna relative to said source antenna before a latency delay.

2. The method according to claim 1, wherein the representation of the received power curve is a decreasing function of the distance between the destination antenna and the focal point.

3. The method according to claim 1, wherein focusing quality is evaluated based on an evaluation of movement of the source communicating entity relative to the destination communicating entity.

4. The method according to claim 1, wherein focusing quality is evaluated based on an estimate of a time symmetry of the received signal.

5. The method according to claim 1, wherein focusing quality is evaluated based on an estimate of a time symmetry and a power symmetry of the received signal.

6. The method according to claim 1, wherein focusing quality is evaluated based on an estimate of a time spreading factor of the signal received by the destination antenna relative to a time spreading factor of a referent signal at the focal point.

7. The method according to claim 6, wherein the evaluation of focusing quality further comprises a step of reception by the destination antenna of a pulse transmitted by the source antenna.

8. The method according to claim 1, wherein focusing quality is evaluated based on an estimate of an autocorrelation of the propagation channel.

9. A non-transitory computer program product for a communicating entity comprising software instructions for commanding execution by said entity of those of the steps of the method according to claim 1 when the program is executed by the communicating entity.

10. A device for estimating a focusing quality of a signal pre-equalized by time reversal of an estimated propagation channel between a source antenna of a source communicating entity and a destination antenna of a destination communicating entity, said communicating entities being relatively movable, said device comprising an evaluator for evaluating a focusing quality of the signal received at the destination antenna relative to a value at a focal point of a representation of a curve of received power as a function of a distance between the destination antenna and the focal point, said focal point corresponding to a position of said destination antenna relative to said source antenna before a latency delay.

11. A communicating entity of a radio communications system comprising a device according to claim 10.

12. A radio communications system comprising at least one communicating entity according to claim 11.

* * * * *